Feb. 19, 1935.  H. V. LUDWICK  1,992,080
METHOD OF MAKING SAFETY ATTACHMENT FOR WHEELS
Original Filed March 21, 1934
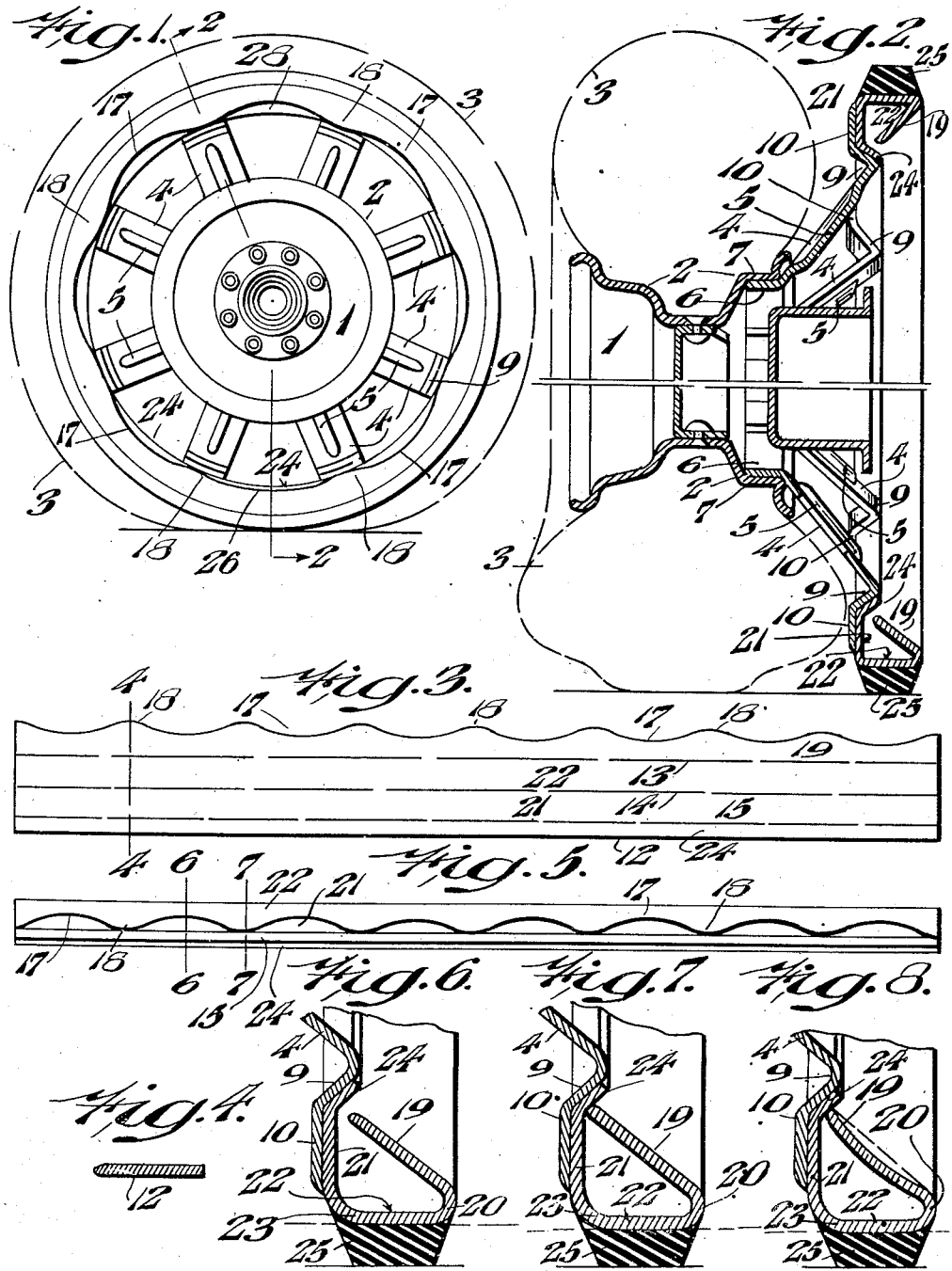
INVENTOR
HERBERT V. LUDWICK,
BY
ATTORNEY Patented Feb. 19, 1935

1,992,080

UNITED STATES PATENT OFFICE 1,992,080

METHOD OF MAKING SAFETY ATTACHMENT FOR WHEELS

Herbert V. Ludwick, Dearborn, Mich., assignor to American Tire Guard Company, Detroit, Mich., a corporation of Michigan Original application March 21, 1934, Serial No. 716,590. Divided and this application August 7, 1934, Serial No. 738,775

5 Claims. (Cl. 29—159)

My invention relates to a new and useful method of making a certain new and useful safety attachment for vehicle wheels, which is disclosed and claimed in my co-pending application No. 716,590, of which the present application is a division. In my co-pending application referred to, I disclosed a novel safety attachment adapted to take the load when the pneumatic tire of a vehicle to which it is applied is deflated suddenly by a blow-out or gradually by a slow leak, both to support the vehicle in lieu of the tire and to prevent the vehicle from turning over or leaving the road, as might happen when the tire is deflated at high speed. The present application relates primarily to a novel method of making and assembling the attachment disclosed in my application aforesaid whereby the cost of manufacture and assembly is reduced to a minimum and whereby a light, efficient and inexpensive construction is produced.

In the accompanying drawing:

Fig. 1 represents a side elevation of a wheel provided with a safety attachment embodying my invention.

Fig. 2 represents, on an enlarged scale, a section on line 2—2 of Fig. 1, the conventional structure of the body of the wheel being omitted to permit enlargement of the parts constituting the invention.

Fig. 3 represents a plan view illustrating the first step in the manufacture of the safety attachment embodying my invention.

Fig. 4 represents a section on line 4—4 of Fig. 3.

Fig. 5 represents a plan view of the strip shown in Fig. 3 after the latter has been formed.

Fig. 6 represents a section, on an enlarged scale, on line 6—6 of Fig. 5 showing the formed strip of Fig. 5 secured to the rim of a wheel.

Fig. 7 is a view similar to Fig. 6 on line 7—7 of Fig. 5.

Fig. 8 is a view similar to Figs. 6 and 7 illustrating the reaction of the attachment under excessive load.

Referring to the drawing in which like reference characters indicate like parts, 1 designates the hub of a wheel and 2 the rim thereof which carries the pneumatic tire 3. The parts heretofore described are conventional and form no part of the invention.

My novel attachment is composed, generally speaking, of a series of reinforced auxiliary spokes, which are secured at suitable peripheral intervals to the rim 2, and of an auxiliary circular rim or member of a generally triangular cross section secured to the outer ends of said spokes, my novel invention further residing in the novel method of forming and assembling said spokes and said auxiliary rim or member with respect to each other and to the wheel. The spokes 4 are provided with the reinforced ribs 5 and are of a generally dished contour having the rectilinear portion 6 thereof secured to the portion 7 of the rim 2 and having formed therein a bead 9 which merges into or terminates in a rectilinear annular portion 10. The auxiliary rim member forming the other part of my invention consists of a flat strip 12, best shown in Figs. 3 and 4, which is folded upon itself along the lines 13, 14 and 15 to form the triangular cross sectional shape best seen in Figs. 2 and 6 to 8. One longitudinal edge of the strip 12 is scalloped or cut into arcuate segments 17 which are separated by what may be called contact or abutment rounded areas 18. The portion 19 is bent over the rest of the strip along the line 13 forming the rounded corner 20 of the desired angle and the section 21 of the strip is bent with respect to the intermediate section 22 along the line 14 into a substantially vertical position and forms the rounded corner 23. The narrow portion 24 is then bent at a slight angle to the vertical portion 21 to form an abutment for the edge of the portion 19 and also to abut against one side of the bead formed in the spoke 4. The rectilinear horizontal portion 22 of the auxiliary rim forms the tread thereof and is preferably provided with a solid rubber tire 25 or its equivalent. The auxiliary rim comprising the parts 19, 21, 22 and 24 is then welded, or otherwise suitably secured, to the outer ends of the spokes 4 with the vertical wall 21 and bent portion 24 abutting against the vertical portion 10 and the bead 9 of the spokes 4, as best seen in Figs. 2 and 6 to 8. The arcuate segments 17 thus abut against and are secured to the various spokes 4 along their rounded contact areas 18, so that each arcuate segment between each pair of contact areas 18 is in the nature of a bridge-like construction and hence possesses a certain degree of resiliency derived from its structure in addition to whatever resiliency may be inherent in the particular kind of steel employed. When the tire 3 is deflated and the weight or load falls upon the auxiliary rim the cushioning tire 25 absorbs the preliminary effects of the shock and the remainder of the load, as well as shock of impact, is gradually absorbed by the tendency of the angular member 19 to move towards the bent portion 24 of the auxiliary rim, as shown at 26 in Fig. 1 where the edge of the angular wall 19 is shown as very close to but not quite contacting the deflected portion 24. The auxiliary rim is made of a gage of steel having an index of tensile strength and resiliency sufficient to support any load within a certain range and to absorb the shock of impact of such a load being thrust suddenly upon the rim. If the auxiliary rim is subjected to a load over the range for which it is designed, the edge of the inclined member 19 will abut against the inclined portion 24 which in turn is reinforced by the beads 9 on the spokes 4. In this position the inclined member 19 interlocks with the inclined portion 24 in accordance with the lines of force exerted thereon and forms a rigid construction of a triangular cross section. If the load to which the auxiliary rim is subjected is still in excess of the amount necessary to interlock the wall 19 with the portion 24, the inclined member 19 tends to assume the slightly concaved position as best seen in Fig. 8, but in no event can the edge of the member 19 slip past the inclined portion against which it abuts in either direction. By comparing the dotted lines with the solid lines shown at the bottom of Figs. 6 to 8 it will be seen that in the process of compression the normally horizontal tread portion 22 tends to assume an inclined position as the angular member 19 of the auxiliary rim approaches the deflected portion 24 and the bead 9. When the load or impact to which the auxiliary rim is subjected is not in excess of the maximum for which it is designed the segmental portions 17 retain their initial structural resiliency and reassume the position shown at 28 in Fig. 1 when they are relieved of the load by the rotation of the wheel. The spokes 4 with their reinforcing ribs 5 afford rigid supports at intervals and the bridge-like segments 17 absorb the load in the intervals intervening between the spokes 4.

It will thus be seen that by my novel method of manufacture and assembly of the safety attachment herein described, or similar attachment embodying the foregoing advantages, a great saving in the consumption of metal used is effected, since the spokes 4 can be cut in the desired lengths from a continuous strip of the desired width and thickness with the ribs 5 shaped at intervals in the long strip before it is cut or in the spokes 4 after they are cut, with absolutely no waste of material, and similarly the strip 12 from which the triangular cross sectional tread member is formed is cut from a long strip of the desired width and thickness, the only waste involved in this step consisting of the narrow strips which are cut out to form the arcuate sections 17. In addition to the fact that the waste of material in cutting has been reduced to a minimum, it is also apparent that by this novel method of manufacture a construction of extremely light weight can be produced. Furthermore, in the event of breakage or damage to one of the spokes 4, for instance, the same can be sweated off and another spoke can be welded in place thereof.

It will also be seen that the spaced spokes 4, as well as the triangular cross sectional tread member, being secured to the pneumatic tire supporting rim 2 act as radiating surfaces to conduct heat from the rim and dissipate such heat, thereby further safeguarding against blow-outs, due to increased air pressure, as well as prolonging the life of the pneumatic tire. With an attachment of this character permanently carried by the wheel of the vehicle the danger attendant on loss of control, due to a blow-out at high speed, is greatly minimized or entirely eliminated due to the immediate substitution, for the pneumatic tire, of a tread for the wheel which is sufficiently resilient and sufficiently rigid to prevent uncontrolled skidding of the vehicle and at the same time to afford sufficient support until the vehicle can be brought to a stop and until the deflated pneumatic tire can be replaced or repaired.

With respect to the arcuate sections 17 which form the bridge-like construction above mentioned, I wish to point out that as long as the critical point of the index of resiliency has not been reached in terms of the load to which the attachment is subjected the bridge-like arcuate sections 17 between the contact points 18 will move towards the portion 24 and bead 9 under load, as shown at 26 in Fig. 1, and will "open" or resume the position shown at 28 in Fig. 1 when the pressure is relieved, thus affording a continuously resilient structure.

This application is a division of my copending application Serial No. 716,590 filed March 21, 1934 for Safety attachment for wheels and methods of making the same.

I claim:

1. The method of making a safety attachment for a vehicle wheel adapted to form a tread therefor when the pneumatic tire of such wheel is deflated, which comprises cutting a plurality of spokes from a strip of metal, forming reinforcing ribs in said spokes, forming beads near the outer ends of said spokes, securing the inner ends of said spokes to the rim of a wheel, cutting a tread member from a strip of metal, forming said tread member into a triangle in cross section, and securing the inner leg of said triangle to the outer ends of said spokes beyond said bead.

2. The method of making a safety attachment for a vehicle wheel adapted to form a tread therefor when the pneumatic tire of such wheel is deflated, which comprises cutting a plurality of spokes from a strip of metal, forming beads near the outer ends of said spokes, securing the inner ends of said spokes to the rim of a wheel, cutting a tread member from a strip of metal, forming said tread member into a triangle in cross section, and securing the inner leg of said triangle to the outer ends of said spokes beyond said bead.

3. The method of making a safety attachment for a vehicle wheel to form a tread therefor when the pneumatic tire of such wheel is deflated, which comprises cutting a plurality of spokes from a strip of metal, securing said spokes to the rim of said wheel, cutting a tread member from a strip of metal, forming said tread member into an annular triangle in cross section with the inner leg of said triangle longer than the outer leg thereof, bending the upper edge of said inner leg at an angle towards the upper edge of the outer leg of said triangle, and securing the inner leg of said triangle to the ends of said spokes.

4. The method of making a safety attachment for a vehicle wheel to form a tread therefor when the pneumatic tire of such wheel is deflated, which comprises cutting a plurality of spokes from a strip of metal, securing said spokes to the rim of said wheel, cutting a tread member from a strip of metal, forming said tread member into an annular triangle in cross section with the inner leg of said triangle longer than the outer leg thereof, bending the upper edge of said inner leg at an angle towards the upper edge of the outer leg of said triangle, abutting the upper edge of the outer leg of said triangle at intervals along the length thereof against the upper deflected portion of the inner leg of said triangle, arcuately spacing the upper edge of the outer leg of said triangle intermediate such abutments from the said deflected upper portion of the inner leg of said triangle, and securing the inner leg of said triangle to the ends of said spokes.

5. The method of making a safety attachment for a vehicle wheel to form a tread therefor when the pneumatic tire of such wheel is deflated, which comprises cutting a plurality of spokes from a strip of metal, forming beads near the outer ends of said spokes, securing said spokes to the rim of said wheel, cutting a tread member from a strip of metal, forming said tread member into an annular triangle in cross section with the inner leg of said triangle longer than the outer leg thereof, bending the upper edge of said inner leg at an angle towards the upper edge of the outer leg of said triangle, abutting the upper edge of the outer leg of said triangle at intervals along the length thereof against the upper deflected portion of the inner leg of said triangle, arcuately spacing the upper edge of the outer leg of said triangle intermediate such abutments from the said deflected upper portion of the inner leg of said triangle, and securing the inner leg of said triangle to the ends of said spokes and the upper deflected portion of the inner leg of said triangle to said bead.

HERBERT V. LUDWICK.